United States Patent [19]

Hashimoto et al.

[11] Patent Number: 4,561,863
[45] Date of Patent: Dec. 31, 1985

[54] GRINDING WHEEL AND MANUFACTURING METHOD THEREOF

[75] Inventors: Masahiro Hashimoto, Kamakura; Hideo Tani, Nara, both of Japan

[73] Assignees: Kabushiki Kaisha Toshiba, Kawasaki; Osaka Kongo Seito Co., Osaka, both of Japan

[21] Appl. No.: 624,771

[22] Filed: Jun. 26, 1984

[30] Foreign Application Priority Data

Jun. 27, 1983 [JP] Japan .................. 58-115445

[51] Int. Cl.⁴ ............................................. B24D 11/00
[52] U.S. Cl. ....................................... 51/295; 51/298; 51/308; 51/309
[58] Field of Search .................. 51/295, 298, 308, 309

[56] References Cited

U.S. PATENT DOCUMENTS

| | | | |
|---|---|---|---|
| 3,062,633 | 11/1962 | Coes, Jr. .............................. | 51/295 |
| 3,904,391 | 9/1975 | Lindstrom et al. .................. | 51/298 |
| 4,008,055 | 2/1977 | Phaal .................................... | 51/298 |
| 4,021,208 | 5/1977 | Oberbichler ......................... | 51/295 |
| 4,099,934 | 7/1978 | Suzuki et al. ........................ | 51/295 |
| 4,247,303 | 1/1981 | Inoue .................................... | 51/295 |
| 4,399,167 | 8/1983 | Pipkin ................................... | 51/295 |
| 4,435,189 | 3/1984 | Bovenkerk ........................... | 51/298 |

FOREIGN PATENT DOCUMENTS 1428937  3/1976  United Kingdom .

Primary Examiner—Paul Lieberman
Assistant Examiner—Willie J. Thompson
Attorney, Agent, or Firm—Cushman, Darby & Cushman

[57] ABSTRACT

A grinding wheel which comprises a number of abrasive grains coated with an electrically conductive material, an electrically non-conductive bond having a number of diamond filler dispersed therein. A method of producing the grinding wheel which comprises preparing a mixture of coated abrasive grains, non-conductive bond and diamond filler, filling the mixture into a mold and molding said mixture by applying a pressure while maintaining said mixture at a constant temperature.

22 Claims, 10 Drawing Figures

GRINDING WHEEL AND MANUFACTURING METHOD THEREOF

BACKGROUND OF THE INVENTION a. Field of the Invention

The present invention relates to an improvement in a grinding wheel and, more particularly, to a grinding wheel suitable for heavy or hard grinding and a manufacturing method thereof.

b. Description of the Prior Art

A grinding wheel using so-called super hard abrasive grains such as diamond, silicon nitride or boron nitride is superior in hardness, durability and wear resistance. Such a grinding wheel is used for various types of workpieces including hard grinding workpieces such as super hard alloys, stone, concrete, glass or ceramics. This type of grinding wheel includes a metal bond grinding wheel, a resinoid bond grinding wheel, or a vitrified bond grinding wheel. This classification is based on the type of bond used for bonding abrasive grains since the performance of the resultant grinding wheel is known to vary significantly in accordance with the type and structure of bond used.

Figure 1:
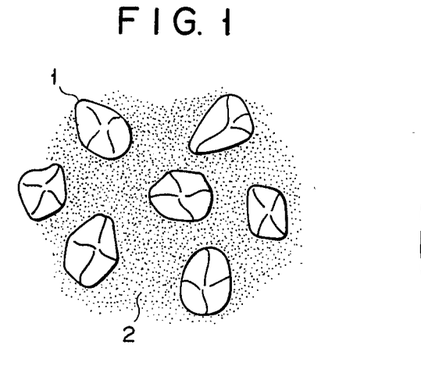
FIG. 1 is an enlarged representation showing the internal structure of a conventional metal bond grinding wheel.

A metal bond grinding wheel is shown in FIG. 1 wherein abrasive grains 1 are held using a metal such as Ni as a bond. This grinding wheel has a strong abrasive grain retaining force, and excellent durability and wear resistance. However, this grinding wheel also has poor penetrative ability and cutting properties and forms only a small number of chip pockets which are easily loaded. In view of this problem, a grinding wheel having a relatively low abrasive grain density of about 75 is generally used. However, this grinding wheel has a low grinding efficiency and cannot provide a satisfactory performance for heavy and hard grinding.

In contrast to this, a resinoid bond grinding wheel using an organic polymeric substance as a bond is superior in the penetrative ability and cutting properties than the metal bond grinding wheel. However, the resinoid bond grinding wheel has a poor abrasive grain retaining force and is not therefore suitable for heavy and hard grinding. The same applies to a vitrified bond grinding wheel.

Figure 2:
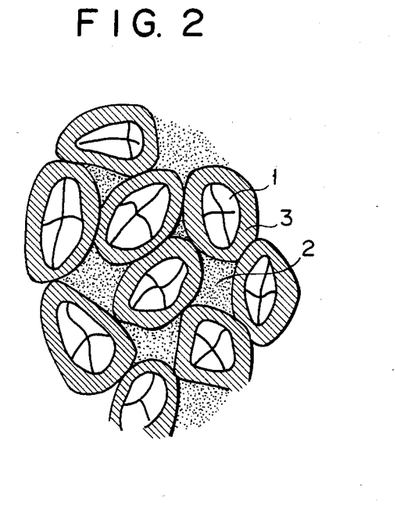
FIG. 2 is an enlarged representation showing the internal structure of a grinding wheel previously proposed by the present inventors.

In view of these problems, a grinding wheel (FIG. 2) has been previously proposed by the present applicant as U.S. Ser. No. 492,826 (filed on May 9, 1983). Referring to FIG. 2, this grinding wheel has a structure wherein abrasive grains 1 are coated with electrically conductive coating films 3, and the abrasive grains 1 thus coated with the conductive films 3 are bonded with a bond 2 comprising an organic polymeric substance. Due to strong bonding strength between the films 3 and the bond 2, the retaining force of the abrasive grains 1 is improved and the abrasive grain density and grinding performance are improved over a conventional resinoid bond grinding wheel or the like. However, this grinding wheel still has a problem of wear of the bond 2, leaving room for further improvements in grinding efficiency, ground surface state and the like.

SUMMARY OF THE INVENTION

It is an object of the present invention to provide a grinding wheel having a high abrasive grain density and a manufacturing method thereof, wherein when the grinding wheel is used for high-efficiency grinding or heavy or hard grinding, the grinding ratio is high, wear of the grinding wheel is small, and the grinding efficiency and the surface state (Roughness) after grinding are both improved.

In order to achieve this object of the present invention, there is provided a grinding wheel, comprising a number of abrasive grains coated with an electrically conductive substance, a nonconductive bond for bonding the super hard abrasive grains, and a diamond filler dispersed in the bond.

There is also provided according to the present invention a method of manufacturing a grinding wheel, comprising the steps of: coating abrasive grains with conductive films in an amount of 30 to 80 wt % based on a content of the abrasive grains; homogeneously mixing the coated abrasive grains, a nonconductive bond, and a diamond filler; injecting a resultant mixture into a mold; and molding under pressure the injected mixture at a predetermined temperature.

In a grinding wheel of the present invention, a number of abrasive grains are coated with conductive films and are bonded thereby. The abrasive grains are bonded with a bond through the conductive films. A filler comprising diamond particles is dispersed in the bond so as to reinforce the retaining force of the abrasive grains. Chip pockets can be easily formed by removal of the filler during grinding. Therefore, the grinding wheel of the present invention has an improved grinding efficiency, allows the use of the filler as a cutting edge, and improves the state of the ground surface. The grinding wheel of the present invention can be conveniently used for high-efficiency grinding and heavy or hard grinding.

DETAILED DESCRIPTION OF THE PREFERRED EMBODIMENT

The preferred embodiment of the present invention will now be described with reference to the accompanying drawings.

Figure 3A:
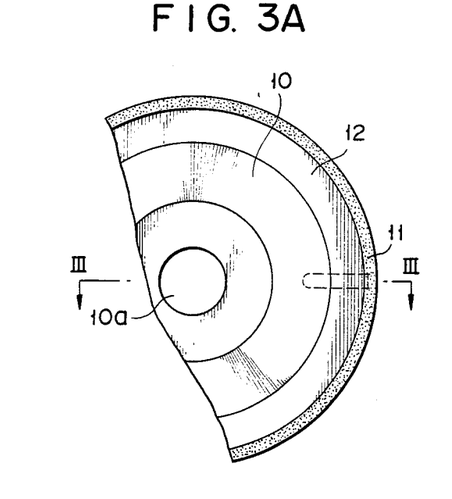
FIG. 3A is a partially cutaway plan view showing an example of a grinding wheel according to the present invention.
Figure 3B:
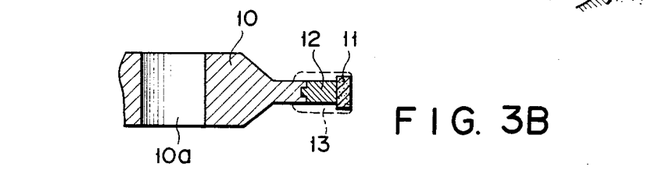
FIG. 3B is a sectional view of the grinding wheel shown in FIG. 3A taken along the line III—III therein.

FIGS. 3A and 3B show an example of a grinding wheel wherein an abrasive grain portion 11 is formed around the outer periphery of a disc 10. The disc 10 consists of a metal such as Al and has a through hole 10a for allowing the disc 10 to be mounted on a rotating shaft of a grinder. The abrasive grain portion 11 is formed around the disc 10 through a ring 12 of an organic polymeric substance such as a phenolic resin. If the abrasive grain portion 11 is conductive and required to be electrically connected to the disc 10, a conductive paint is applied across the ring 12 to form conductive layers 13, as indicated by broken lines in FIG. 3B.

Figure 4:
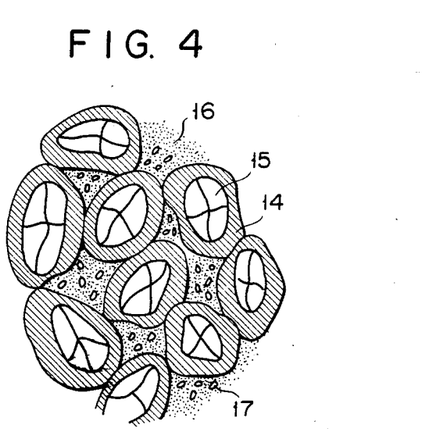
FIG. 4 is an enlarged representation showing the internal structure of a grinding wheel according to the present invention.

FIG. 4 is an enlarged representation of the abrasive grain portion 11. The abrasive grain portion 11 consists of a number of abrasive grains 15, conductive coating films 14 covering each of the abrasive grains 15 and being contacted each other, a bond 16 filled between the abrasive grains 15 coated with the films 14 so as to bond them, and a diamond filler 17 dispersed in the bond 16. The abrasive grains 15 may be synthetic or natural diamond grains, cubic silicon nitride grains or cubic boron nitride grains having a grain distribution falling within 40 to 1,000 U.S. mesh. The example shown in the drawings uses diamond abrasive grains. The material for forming the coating films 14 covering the abrasive grains 15 must be one which has good adhesion with the abrasive grains 15, and a satisfactory strength to prevent undesirable removal of the abrasive grains 15 during grinding, and one which can easily deform for attaining good bonding during a hot-pressing step for manufacturing a grinding wheel, to be described later. Examples of such a material include Cu, Ag, Au, Sn, Zn, Al, Ni and Cr, or alloys thereof. The coating film 14 is formed on the abrasive grains 15 as a single layer film of a single metal or metal alloy selected from those enumerated above by a known method such as plating or vacuum deposition. However, in order to reinforce the function of the coating film 14, the film 14 can comprise a two- or multi-layer structure of the same or different metals.

The two-layer structure preferably comprises a first layer which is directly in contact with the abrasive grains 15 and which consists of a relatively soft metal with good adhesion with the grains, and a second layer which covers the first layer and which consists of a relatively hard metal. When the two-layer structure is to comprise a single material, the first layer can, for example, be formed by electroless nickel plating and the second layer can be formed thereover by electrolytic nickel plating. When the two-layer structure is to comprise different metals, the first layer can, for example, be formed by copper plating and the second layer can be formed by nickel plating.

The bond 16 must have good adhesion with the coating films 14. Examples of such a bond include various synthetic polymeric substances such as a phenolic resin, epoxy resin, polyamide, unsaturated polyester, polyimide, polyacetal, or polyacryl; and natural organic polymeric substances such as shellac. The diamond filler 17 to be dispersed in the bond 16 must have a grain size smaller than that of the abrasive grains 15 and has a mesh size of preferably about ½ to 1/20 and more preferably 1/5 to 1/10 of the abrasive grain. In this case, the thickness of the filler 17 is preferably smaller than that of the coating films 14 formed on the abrasive grains 15.

In order to provide a satisfactory abrasive grain portion 11, the amount of the coating films 14 must be 30 to 80 wt % based on the content of the abrasive grains 15, and the portion 11 must contain the abrasive grains 15 coated with the films 14 in the amount of 33 to 64 vol %. Especially when the abrasive grain portion 11 must have electrical conductivity, the amount of the abrasive grains coated with the films 14 must fall within the range of 40 to 64 vol %. The amount of the filler 17 in the bond 16 preferably falls within the range of 3 to 30 vol %. When the amount of the filler 17 dispersed in the bond 16 falls within this range, the flexural strength is improved significantly, as will be demonstrated by the results obtained from experiments conducted by the present inventors. The filler 17 is mostly dispersed and fixed in the bond 16 during the manufacture of the grinding wheel. However, a portion of the filler 17 is inserted between the coating films 14 after bonding with the adjacent abrasive grains 15 and is fixed there.

The method of manufacturing the grinding wheel as described above will now be described. The disc 10 of a predetermined shape is formed by grinding or the like. The ring 12 of an organic polymeric substance is formed on the outer periphery of the disk 10. The disc 10 with the ring 12 mounted thereon is placed in a hot-pressing mold defining an annular groove of a predetermined size between itself and the outer periphery of the ring 12.

The abrasive grain portion 11 is formed in the following procedures. Abrasive grains 15 having a desired grain size distribution are selected. A metal selected from those enumerated hereinabove is coated on the surfaces of the abrasive grains 15 by plating or vacuum deposition so as to form coating films 14 thereon. A bond 16, such as a phenolic resin, and the diamond filler 17 are added in prescribed amounts to the abrasive grains 15 coated with the films 14 and the mixture is homogeneously mixed. This mixture is injected into the annular groove formed between the ring 12 and the hot-pressing mold. The mixture is hot-pressed while the mixture, the disc 10 and the mold are kept at a predetermined temperature. The heating/pressure conditions for this hot-pressing differ in accordance with the type of a metal used for coating the abrasive grains, the type of bond, the amount of the metal coating on the abrasive grains, and the mixing ratio of the abrasive grains 15 coated with the metal, the bond 16 and the filler 17. Especially, the temperature for pressing must fall within a range such that the bond 16 is softened or is decreased in viscosity so as to emit gases contained therein. Pressing prevents the expansion of the bond due to gases contained therein and allows plastic deformation of the metal covering the abrasive grains 15, thereby facilitating adhesion between the coating films and the abrasive grains. Pressing at the predetermined temperature can be performed intermittently a plurality of times. This intermittent pressing further facilitates emission of the gases and plastic deformation of the coating metal. In other words, heating and pressing conditions in this hot-pressing process are important factors in improving the abrasive grain density. This hot-pressing substantially eliminates pores in the bond and allows formation of the abrasive grain portion 11 of a dense structure wherein the metal films covering the abrasive grains 15 are securely bonded with each other and the abrasive grains 15 are fixed at a high density. Upon the plastic deformation of the coating metal 14, the filler 17 in the bond 16 is mostly expelled from the bonding portion between the films 14 of adjacent abrasive grains 15. However, the filler 17 is partially left at such bonding portions and is fixed therein. In order to obtain firm adhesion between the abrasive grain portion 11 and the ring 12, an adhesive may be applied on the outer periphery of the ring 12.

The abrasive grain portion 11 formed by hot-pressing is forcibly or naturally cooled while still under pressure. The portion 11 together with the disc 10 are released from the hot-pressing mold. The grinding wheel is completed after finishing processes of the disc 10 and the ring 12, size correction of the portion 11, and dressing.

Alternatively, an annular abrasive grain portion 11 is molded with a pair of hot-pressing molds. The portion 11 is fitted around a disc 10 with a ring 12 and is adhered with an adhesive.

A section of the portion 11 can be observed under a microscope so as to determine if the portion 11 has a satisfactory structure as shown in FIG. 4. However, if the coating films 14 covering the abrasive grains 15 are bonded to each other, the structure of the portion 11 can be nondestructively tested by conductivity measurement. The conductivity of the portion 11 can be measured in the following manner. A low voltage of about 10 V is applied to ends of a diametrical line of the portion 11, ends of two diametrical lines which are spaced apart by 90°, or any two points on the portion 11 which are spaced apart from each other by a predetermined distance. Application of such a voltage is repeated a plurality of times for different diametrical directions or for different pairs of points.

Figure 5:
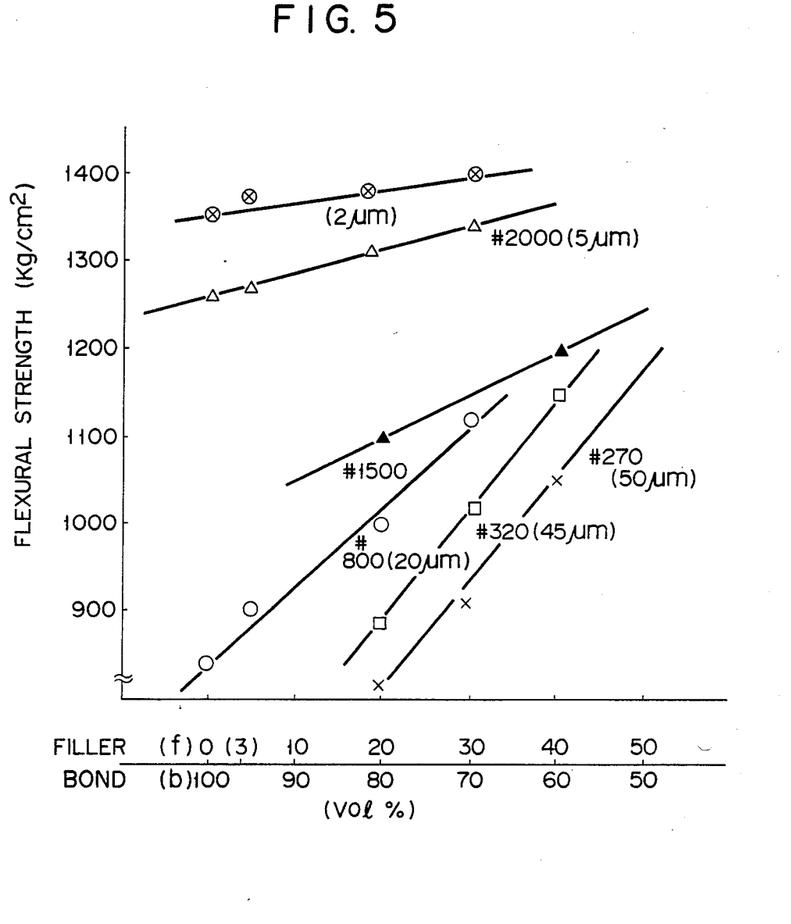
FIG. 5 is a graph showing the flexural strength as a function of the volume content ratio of filler to bond, using filler of various grain sizes.

The performance of the grinding wheel manufactured in this manner will now be described. FIG. 5 shows the flexural strength of members (without abrasive grains 15) which were manufactured by variously changing the mixing ratio of fillers (diamond particles) (f) 17 of various grain size and bond (phenolic resin) (b) 16. The flexural strength of the grinding wheel is associated with the strength of the grinding wheel and with the abrasive grain retaining force thereof. Referring to the graph shown in FIG. 5, a maximum flexural strength is obtained when the abrasive grain of the filler 17 is minimum (2 μm). The flexural strength is seen to decrease with an increase in the grain size of the filler 17. For a filler 17 of the same grain size, the flexural strength is increased with an increase in the content of the filler 17.

Figure 6:
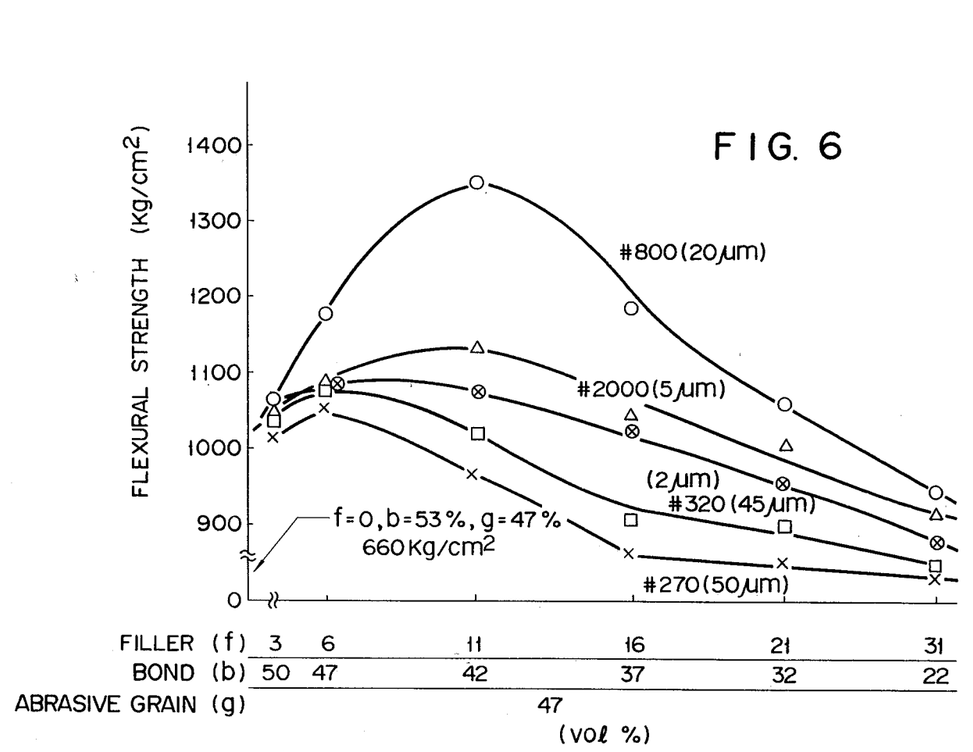
FIG. 6 is a graph showing the flexural strength as a function of the volume mixing ratio of filler, diamond grain and bond, using filler of various grain sizes.

FIG. 6 shows the flexural strength of grinding wheels as a function of the contents of a filler and a bond using the grain size of the filler as a parameter. These grinding wheels contained a predetermined amount (47 vol %) of diamond abrasive grains (g) 15 having a grain size distribution of #100/120 (120 μm to 150 μm) and covered with Ni coating films 14 in the amount of 56 wt %. The contents of the filler comprising diamond particles and the bond comprising a phenolic resin to be mixed with the abrasive grains were varied. The results shown in FIG. 6 reveal the following facts. A grinding wheel which does not contain the filler 17 (other conditions are the same) has a flexural strength of 660 kg/cm². However, when the filler 17 is dispersed in the bond 16 of such a grinding wheel, the flexural strength of the resultant grinding wheel changes in accordance with the content of the filler 17. When the content of the filler 17 falls within a range between 3 and 30 vol %, the grinding wheel has a higher flexural strength than that of the grinding wheel which does not contain the filler 17 at all. This fact indicates that the strength and abrasive grain retaining force of the grinding wheel change in accordance with the content of the filler 17. When the diamond abrasive grains having a grain size distribution of #100/120 are used and the grain size of the filler 17 is #800, a maximum flexural strength is obtained when the filler 17 is added in the amount of 11 vol %. In this manner, an optimum mixing ratio of the filler 17 with respect to the abrasive grains 15 is present in accordance with the grain size of the filler 17.

The grinding performance of the grinding wheel of the present invention will be illustrated below together with the same of other grinding wheels. Table 1 below shows the materials and their amounts for three types of grinding wheels tested. Grinding wheel A is a grinding wheel of the present invention (abrasive grains 15 have a grain size distribution of #100/120, and a filler 17 has a grain size of 20 μm). Grinding wheel B is a grinding wheel according to U.S. Ser. No. 492,826 wherein abrasive grains 15 are covered with coating films 14 and bonded with a bond 16 (a filler 17 is not dispersed in the bond 16). Grinding wheel C is a commercially available hard grinding wheel. The grinding test was performed with known inorganic hard grinding materials as heat- and wear-resistant materials.

TABLE 1

|  | A | B | C |
|---|---|---|---|
| Abrasive grain (p) | Diamond | Diamond | Diamond |
| Coating film (m) | Ni | Ni | — |
| Bond (b) | Phenolic resin | Phenolic resin | Resin |
| Filler (f) | Diamond powder | — | — |
| Coating film content (wt %) | 56 | 56 | 0 |
| Grain content including coating film (vol %) | 50 | 50 | — |
| Bond content (vol %) | 39 | 50 | — |
| Filler content (vol %) | 11 | 0 | 0 |

Figure 7:
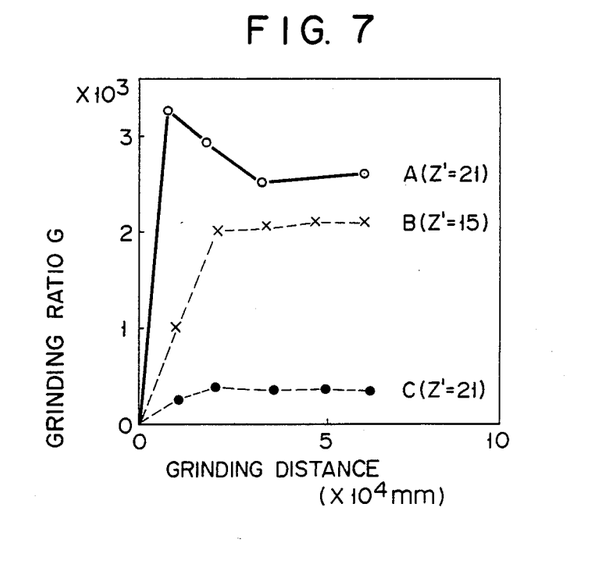
FIG. 7 is a graph showing the grinding ratio as a function of grinding distance of various grinding wheels.
Figure 8:
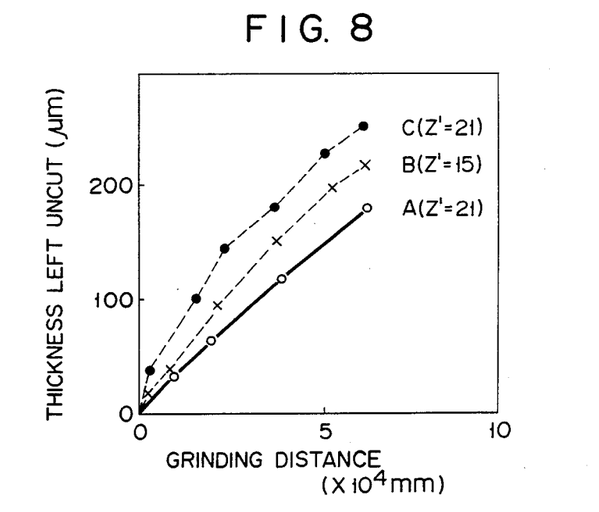
FIG. 8 is a graph showing a residual thickness left uncut as a function of grinding distance of various grinding wheels.
Figure 9:
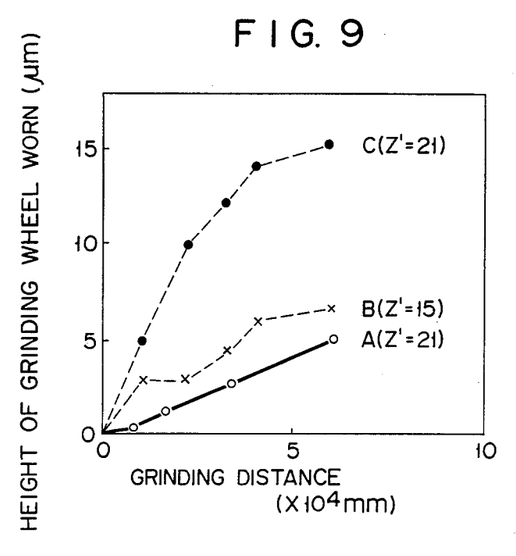
FIG. 9 is a graph showing depth of wear of the grinding wheel as a function of grinding distance.

The grinding ratio G in FIG. 7 represents the relationship between the grinding ratio and the grinding distance. As shown in FIG. 7, the grinding wheel B (previously proposed by the same applicant which has abrasive grains 15 covered with the coating films 14 and bonded with the bond 16) has a significantly higher grinding ratio G than the grinding wheel C. However, the grinding wheel A of the present invention has a still higher grinding ratio G than the grinding wheel B not to mention the grinding wheel C. The uncut distance represents the difference between the preset grinding amount and the actual grinding amount. As can be seen from FIG. 8, the grinding wheel B has a smaller uncut distance than that of the grinding wheel C. However, the grinding wheel A of the present invention has a still smaller uncut distance and therefore is capable of high-precision grinding. FIG. 9 shows the depth of wear of the grinding wheel as a function of total grinding distance. It is seen from FIG. 9 that the grinding wheel B has a smaller wear than the grinding wheel C but the grinding wheel A has a still smaller and stabler wear than the grinding wheel B.

In order to clearly demonstrate the good grinding performance of the grinding wheel A of the present invention, Table 2 below shows various properties of the grinding wheels A, B and C for the same grinding distance.

TABLE 2

| | Grinding wheel | | |
|---|---|---|---|
| Evaluation item | Grinding wheel C | Grinding wheel B | Grinding wheel A |
| Grinding ratio G | 300 | 2,100 | 2,600 |

TABLE 2-continued

| | Grinding wheel | | |
|---|---|---|---|
| Evaluation item | Grinding wheel C | Grinding wheel B | Grinding wheel A |
| Grindability (actual grinding amount/preset grinding amount) | 99.4 | 99.5 | 99.8 |
| Wear depth (μm) | 15 | 7 | 5 |
| Grinding efficiency Z' (mm³/mm · s) | 2.1 | 15 | 21 |
| Roughness of ground surface $R_{max}$ (μm) | 4.5 | 4.0 | 2.8 |

Table 2 shows as evaluation items the grindability as the ratio of the actual grinding amount to the preset grinding amount in place of the uncut thickness, the grinding efficiency Z', and the roughness of the ground surface in addition to the grinding ratio and the wear depth. The grinding efficiency Z' was tested by wet grinding using a surface grinding machine. The grinding amount was preset to be 60 μm/pass, the grinding wheel velocity was set to be 1800 m/min, and the table moving velocity (workpiece moving velocity) was set to be 20.6 m/min (15 m/min for the grinding wheel C).

It is seen from Table 2 that the grinding wheel A of the present invention has an excellent grinding ratio, and grindability and wear properties as well as excellent grinding efficiency and smoothness of the ground surface as compared to the grinding wheels B and C. The results shown also indicate that with a filler 17 having a smaller grain size the ground surface will be smoother.

Such excellent properties of the grinding wheel of the present invention are attributed to the following reasons. The first reason is a good abrasive grain retaining force. This good abrasive grain retaining force is obtained since the abrasive grains 15 serving as a cutting edge are completely covered with and securely held by the coating films 14 which are bonded to each other, and the abrasive grains 15 are furthermore held through the coating films 14 by the bond 16 in which a diamond filler 17 is dispersed. The diamond filler 17 partially extends into the coating films 14 covering the abrasive grains 15 to provide a dispersion strengthening phenomenon notably higher than other hard materials. Secondly, the grinding wheel of the present invention containing a diamond filler has a greater number of abrasive grains, that is, a higher abrasive grain density (130 or more) than the conventional grinding wheel. Thirdly, the filler 17 comprising diamond particles dispersed in the bond 16 allows easy chip pockets to be formed upon removal during grinding so as to prevent frequent loading. Fourthly, the filler 17 also serves as a secondary cutting edge to allow fine grinding. When the grain size of the filler 17 is rendered small as compared to the abrasive grains 15, the resultant grinding wheel has an improved strength, a longer life and produces a smoother ground surface in addition to the advantages as described above.

According to the present invention, an indefinite number of abrasive grains coated with conductive films are bonded to each other through a bond, and a hard filler is dispersed in the bond. Thus, the abrasive grain retaining force can be reinforced by the bonding force between the coating films. Removal of the filler during grinding allows easy formation of chip pockets to improve the grinding efficiency. The filler also serves as a cutting edge to improve the smoothness of the ground surface. A highly efficient grinding wheel suitable for heavy or hard grinding is therefore provided.

What is claimed is:

1. A grinding wheel comprising a number of abrasive grains coated with a conductive material, a nonconductive bond for bonding the abrasive grains, and a diamond filler dispersed in the bond.

2. A grinding wheel according to claim 1, wherein the abrasive grains are grains of a material selected from the group consisting of diamond, cubic silicon nitride and cubic boron nitride.

3. A grinding wheel according to claim 2, wherein the abrasive grains are contained in the grinding wheel in an amount of 30 to 64% by volume with respect to a total volume of the grinding wheel.

4. A grinding wheel according to claim 2, wherein the abrasive grains have a grain size of 40 to 1,000 U.S. mesh.

5. A grinding wheel according to claim 1, wherein the conductive material is coated on the abrasive grains in an amount of 30 to 80% by weight with respect to a total weight of the abrasive grains.

6. A grinding wheel according to claim 5, wherein the conductive material is a member selected from the group consisting of copper, silver, gold, tin, zinc, aluminum, chromium, and alloys thereof.

7. A grinding wheel according to claim 5, wherein the conductive material is formed as a multi-layer structure.

8. A grinding wheel according to claim 7, wherein the conductive material is formed as a two-layer structure consisting of an inner layer formed by electroless plating and an outer layer formed by electrolytic plating.

9. A grinding wheel according to claim 7, wherein the conductive material is formed as a two-layer structure wherein an outer layer has a higher strength than that of an inner layer.

10. A grinding wheel according to claim 9, wherein the inner layer consists of copper, and the outer layer consists of nickel.

11. A grinding wheel according to claim 1, wherein the nonconductive bond comprises an organic polymeric substance.

12. A grinding wheel according to claim 11, wherein the organic polymeric substance is a member selected from the group consisting of a phenolic resin, epoxy resin, polyamide, unsaturated polyester, polyimide, polyacetal, and polyacryl.

13. A grinding wheel according to claim 1, wherein the diamond filler is contained in the bond in an amount of 3 to 30% by weight with respect to a weight of the bond.

14. A grinding wheel according to claim 13, wherein the diamond filler has a grain size smaller than that of the abrasive grains.

15. A grinding wheel according to claim 1, wherein the diamond filler has a grain size smaller than that of the abrasive grains.

16. A grinding wheel according to claim 15, wherein the diamond filler has a grain size ½ to 1/20 of that of the abrasive grains in U.S. mesh.

17. A grinding wheel according to claim 16, wherein the diamond filler has a grain size 1/5 to 1/10 of that of the abrasive grains in U.S. mesh.

18. A grinding wheel according to claim 17, wherein the diamond filler has a conductive film formed thereon.

19. A grinding wheel according to claim 18, wherein the conductive film is formed of a material selected from the group consisting of copper, silver, gold, tin, zinc, and aluminum.

20. A method of manufacturing a grinding wheel, comprising the steps of:

(i) coating abrasive grains with a conductive material in an amount of 30 to 80% by weight with respect to a weight of the abrasive grains;

(ii) homogeneously mixing the abrasive grains coated with the conductive material with a nonconductive bond and a diamond filler;

(iii) injecting a resultant mixture in a mold; and (iv) forming under pressure the mixture injected into the mold at a predetermined temperature.

21. A method according to claim 20, wherein said step (iv) is intermittently performed a plurality of times.

22. A method according to claim 20, wherein the predetermined temperature in said step (iv) is a temperature which allows emission of gases contained in the resultant mixture.

* * * * *

UNITED STATES PATENT AND TRADEMARK OFFICE
CERTIFICATE OF CORRECTION

PATENT NO. : 4,561,863
DATED : December 31, 1985
INVENTOR(S) : Masahiro HASHIMOTO, Hideo TANI It is certified that error appears in the above-identified patent and that said Letters Patent is hereby corrected as shown below:

ON THE FIRST INFORMATION PAGE:

Change "[73] Assignee: Tokyo Shibaura Denki Kabushiki Kaisha, Kawasaki, Japan, Osaka Kongo Seito Co., Osaka, Japan" to --[73] Assignee: Kabushiki Kaisha Toshiba, Kawasaki; Osaka Kongo Seito Co., Ltd., Osaka, Japan --.

Signed and Sealed this

First Day of July 1986

[SEAL]

Attest:

DONALD J. QUIGG

Attesting Officer

Commissioner of Patents and Trademarks